United States Patent
Min et al.

(10) Patent No.: US 10,297,852 B2
(45) Date of Patent: May 21, 2019

(54) POLYMER ELECTROLYTE MEMBRANE, MEMBRANE ELECTRODE ASSEMBLY COMPRISING POLYMER ELECTROLYTE MEMBRANE, AND FUEL CELL COMPRISING MEMBRANE ELECTRODE ASSEMBLY

(71) Applicant: LG CHEM, LTD., Seoul (KR)

(72) Inventors: Minkyu Min, Daejeon (KR); Young Sun Park, Daejeon (KR); Hyuk Kim, Daejeon (KR); Seong Ho Choi, Daejeon (KR); Sangwoo Lee, Daejeon (KR); Doyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 270 days.

(21) Appl. No.: 15/038,951

(22) PCT Filed: Nov. 26, 2014

(86) PCT No.: PCT/KR2014/011441
§ 371 (c)(1),
(2) Date: May 24, 2016

(87) PCT Pub. No.: WO2015/080475
PCT Pub. Date: Jun. 4, 2015

(65) Prior Publication Data
US 2017/0005355 A1    Jan. 5, 2017

(30) Foreign Application Priority Data
Nov. 26, 2013 (KR) ................. 10-2013-0144444

(51) Int. Cl.
*H01M 8/1053* (2016.01)
*H01M 8/1004* (2016.01)
(Continued)

(52) U.S. Cl.
CPC ....... *H01M 8/1053* (2013.01); *H01M 8/1004* (2013.01); *H01M 8/1018* (2013.01);
(Continued)

(58) Field of Classification Search
CPC ............ H01M 8/1018; H01M 8/1025; H01M 8/1044; H01M 8/1053
(Continued)

(56) References Cited

U.S. PATENT DOCUMENTS

| | | |
|---|---|---|
| 2003/0232184 A1 | 12/2003 | Morikawa et al. |
| 2006/0083962 A1 | 4/2006 | Takekawa et al. |

(Continued)

FOREIGN PATENT DOCUMENTS

| | | |
|---|---|---|
| CN | 101087029 | 12/2007 |
| CN | 102104156 | 6/2011 |

(Continued)

OTHER PUBLICATIONS

Office Action of Chinese Patent Office in Appl'n No. 201480071336.5 dated Jan. 30, 2018.

*Primary Examiner* — James M Erwin
(74) *Attorney, Agent, or Firm* — Dentons US LLP

(57) ABSTRACT

The present specification provides a polymer electrolyte membrane, a membrane electrode assembly including the polymer electrolyte membrane, and a fuel cell including the membrane electrode assembly.

19 Claims, 5 Drawing Sheets

(51) Int. Cl.
  *H01M 8/1044* (2016.01)
  *H01M 8/1058* (2016.01)
  *H01M 8/1067* (2016.01)
  *H01M 8/1018* (2016.01)
  *H01M 8/1025* (2016.01)
  *H01M 8/1062* (2016.01)
  *H01M 8/1065* (2016.01)
  *H01M 8/1041* (2016.01)
  *H01M 8/1027* (2016.01)
  *H01M 8/103* (2016.01)
  *H01M 8/1032* (2016.01)
  *H01M 8/1039* (2016.01)

(52) U.S. Cl.
  CPC ....... *H01M 8/1025* (2013.01); *H01M 8/1044* (2013.01); *H01M 8/1058* (2013.01); *H01M 8/1062* (2013.01); *H01M 8/1065* (2013.01); *H01M 8/1067* (2013.01); *H01M 8/103* (2013.01); *H01M 8/1027* (2013.01); *H01M 8/1032* (2013.01); *H01M 8/1039* (2013.01); *H01M 8/1041* (2013.01); *H01M 2008/1095* (2013.01); *H01M 2250/20* (2013.01); *H01M 2300/0082* (2013.01); *H01M 2300/0088* (2013.01); *H01M 2300/0091* (2013.01); *H01M 2300/0094* (2013.01); *Y02E 60/521* (2013.01); *Y02T 90/32* (2013.01)

(58) Field of Classification Search
  USPC ........................................................ 429/482
  See application file for complete search history.

(56) References Cited

U.S. PATENT DOCUMENTS

| | | | |
|---|---|---|---|
| 2007/0231653 A1 | 10/2007 | Kim et al. | |
| 2007/0287051 A1 | 12/2007 | Onuma et al. | |
| 2009/0220844 A1* | 9/2009 | Suzuki | H01M 8/0289 |
| | | | 429/492 |
| 2013/0045436 A1* | 2/2013 | Choi | C08J 5/22 |
| | | | 429/494 |
| 2013/0177834 A1 | 7/2013 | Lee et al. | |
| 2013/0178834 A1 | 7/2013 | Greenberg et al. | |

FOREIGN PATENT DOCUMENTS

| | | |
|---|---|---|
| EP | 1998393 A1 | 12/2008 |
| EP | 2960974 A1 | 12/2015 |
| JP | 2005-044610 A | 2/2005 |
| JP | 2005050561 A | 2/2005 |
| JP | 2006120409 A | 5/2006 |
| JP | 2007-257884 A | 10/2007 |
| JP | 2009-252723 A | 10/2009 |
| JP | 5104696 B2 | 12/2012 |
| KR | 10-2005-0018624 A | 2/2005 |
| KR | 10-2007-0098323 A | 10/2007 |
| KR | 10-2012-0111395 A | 10/2012 |
| KR | 20120128905 A | 11/2012 |

* cited by examiner

[Fig 1]
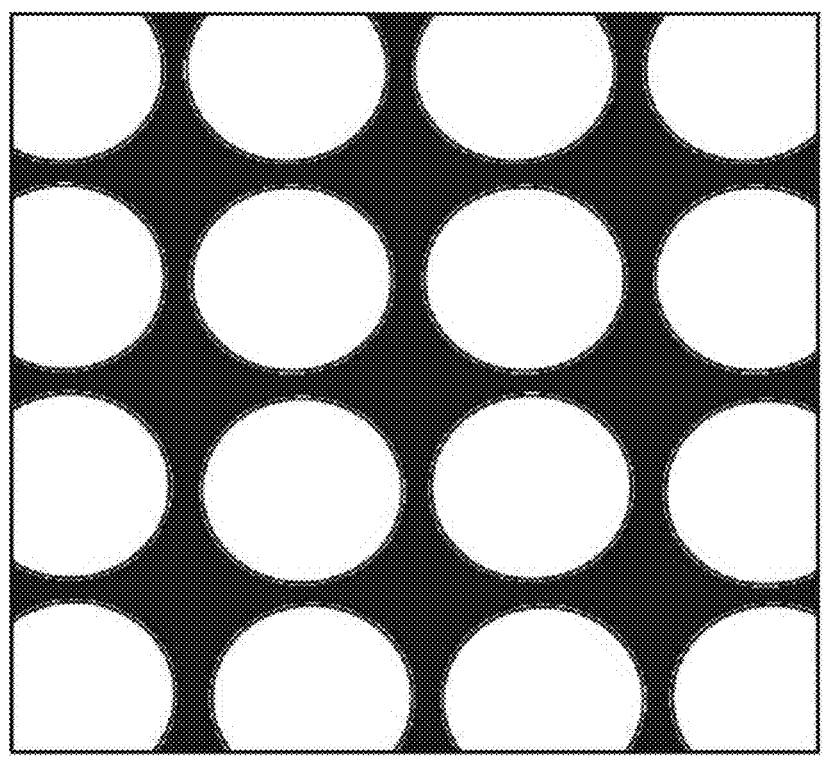

[Fig 2]
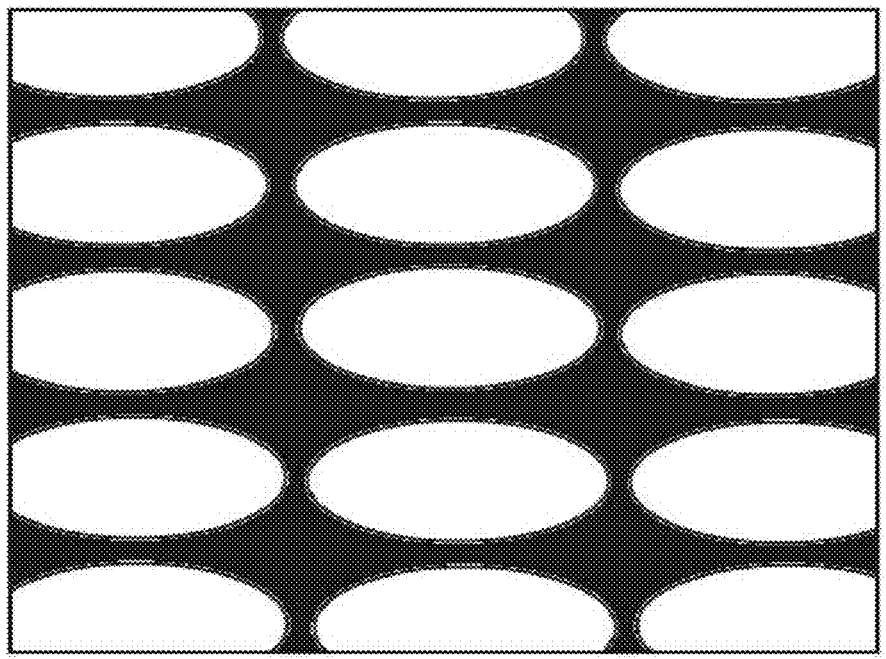
[Fig 3]
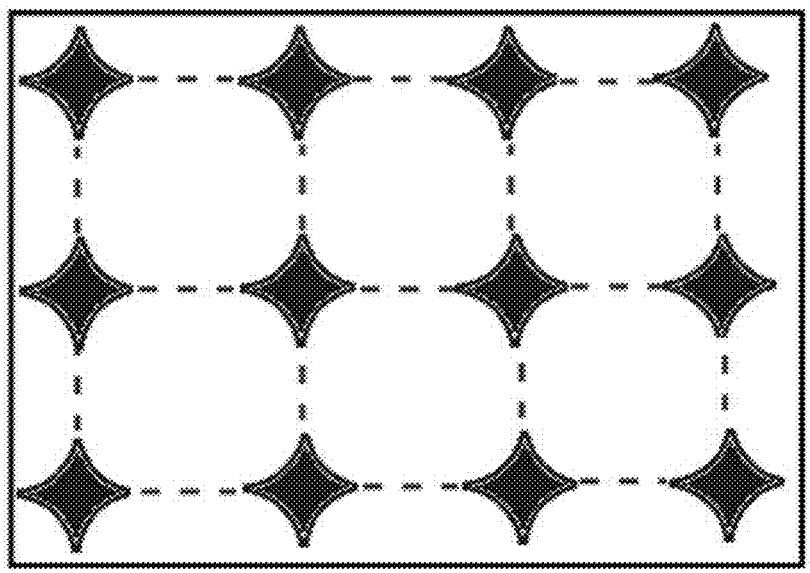

[Fig 4]
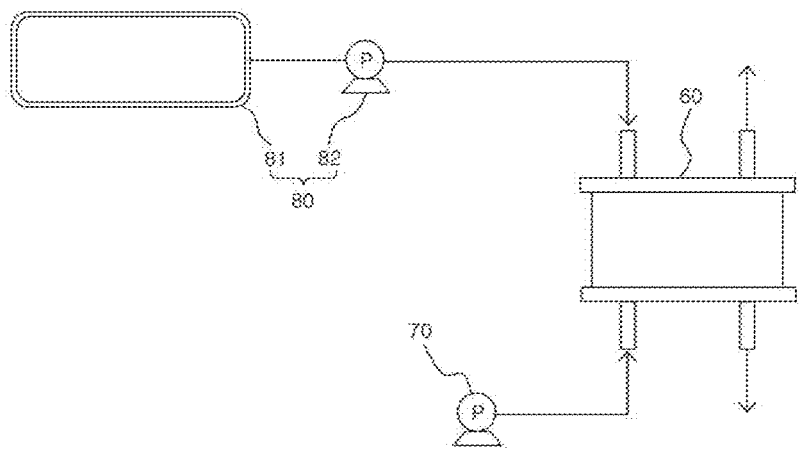
[Fig 5]
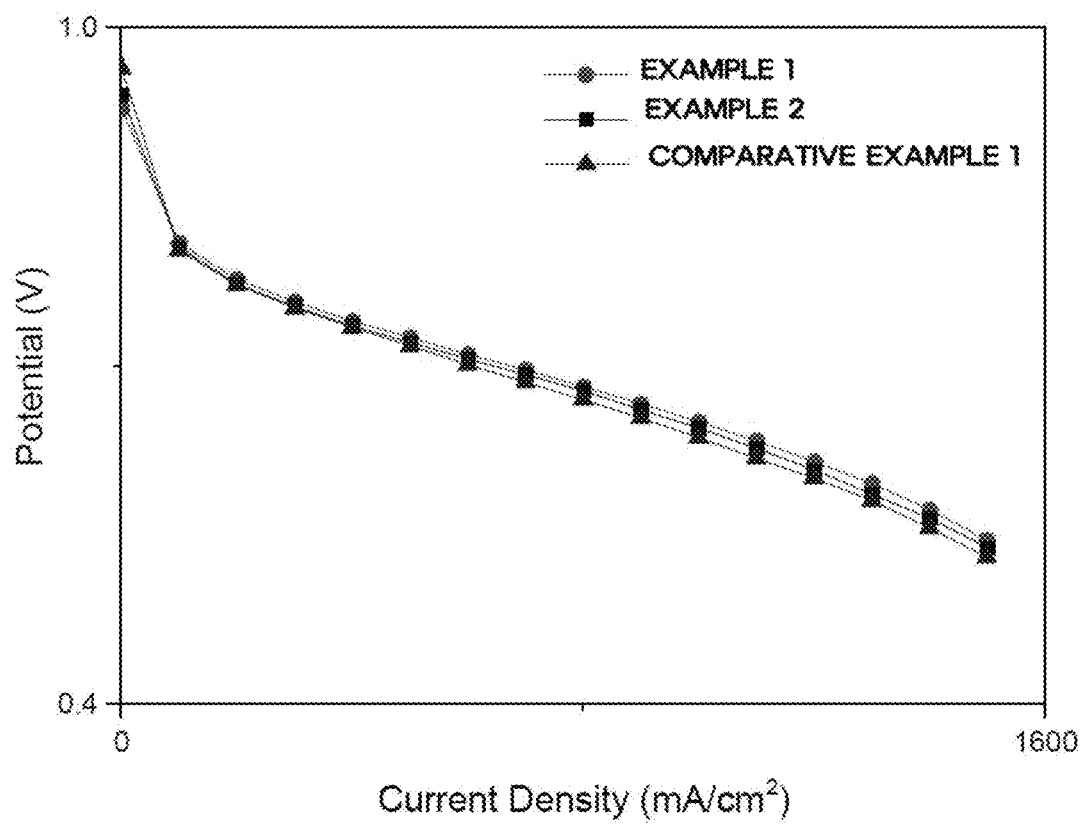

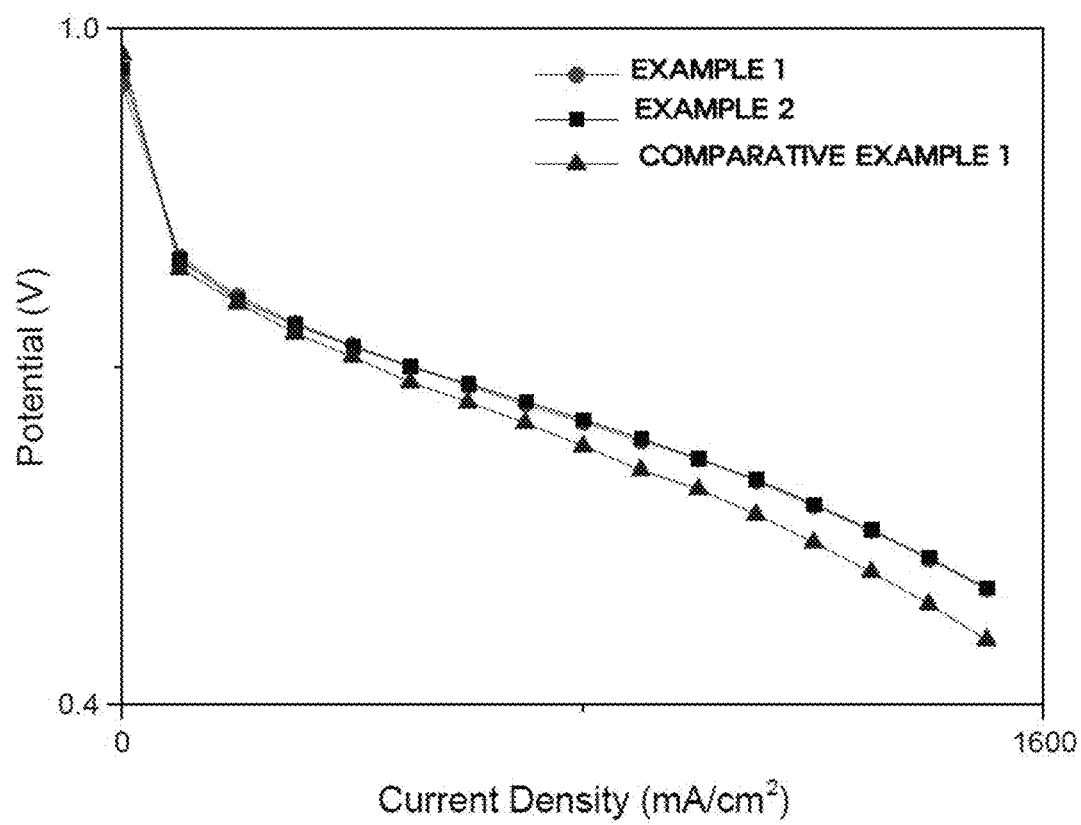
[Fig 6]

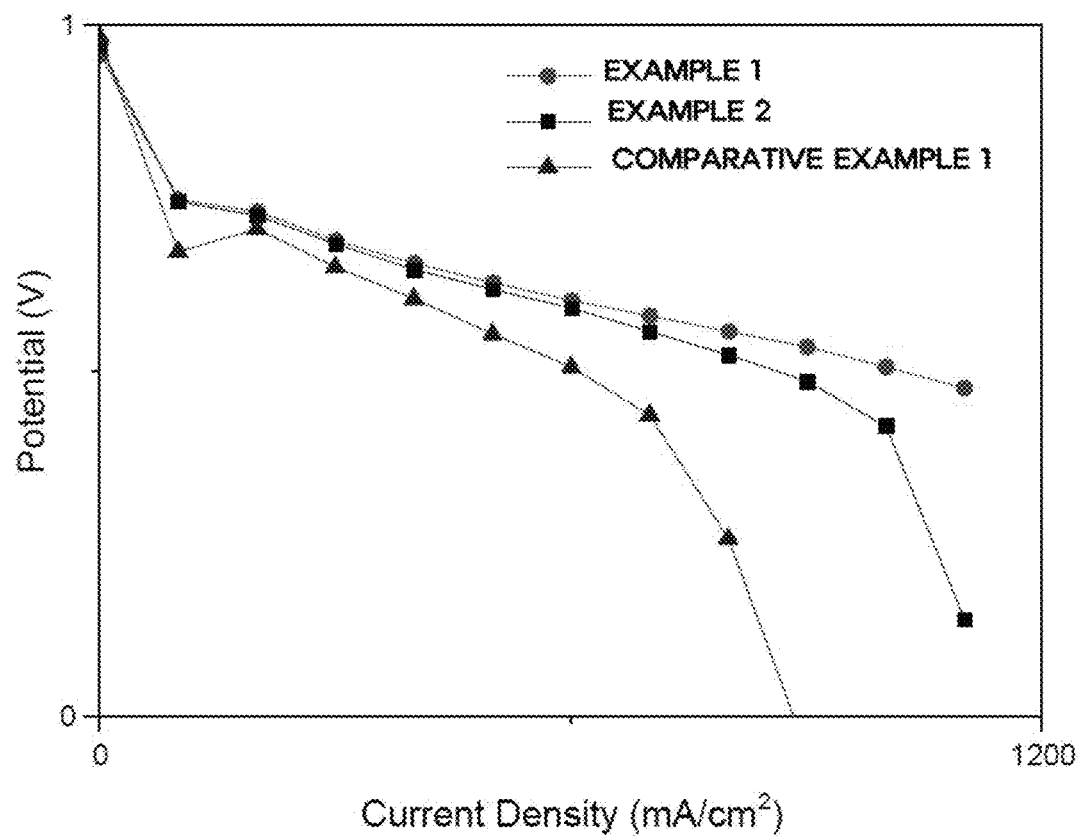
[Fig 7]

POLYMER ELECTROLYTE MEMBRANE, MEMBRANE ELECTRODE ASSEMBLY COMPRISING POLYMER ELECTROLYTE MEMBRANE, AND FUEL CELL COMPRISING MEMBRANE ELECTRODE ASSEMBLY

This application is a National Stage Entry of International Application No. PCT/KR2014/011441, filed Nov. 26, 2014, and claims the benefit of and priority to Korean Application No. 10-2013-0144444, filed on Nov. 26, 2013, all of which are hereby incorporated by reference in their entirety for all purposes as if fully set forth herein.

TECHNICAL FIELD

The present specification claims priority to and the benefits of Korean Patent Application No. 10-2013-0144444, filed with the Korean Intellectual Property Office on Nov. 26, 2013, the entire contents of which are incorporated herein by reference.

The present specification provides a polymer electrolyte membrane, a membrane electrode assembly including the polymer electrolyte membrane, and a fuel cell including the membrane electrode assembly.

BACKGROUND ART

Fuel cells are a highly efficient power generating device, and have advantages in that the amount of fuel use is low due to high efficiency compared to existing internal combustion engines, and it is a pollution-free energy source that does not produce environmental pollutants such as $SO_x$, $NO_x$ and VOC. In addition, there are additional advantages in that a locational area required for production facilities is small, and a construction period is short.

Accordingly, fuel cells have diverse applications covering a mobile power supply such as portable devices, a transport power supply such as vehicles, and dispersion power generation usable for households and electric power industries. Particularly, when an operation of a fuel cell vehicle, a next generation transportation device, is commercialized, the potential market size is expected to be extensive.

Fuel cells are largely divided into 5 types depending on an operating temperature and an electrolyte, which specifically includes an alkali fuel cell (AFC), a phosphoric acid fuel cell (PAFC), a molten carbonate fuel cell (MCFC), a solid oxide fuel cell (SOFC), a polyelectrolyte fuel cell (PEMFC) and a direct methanol fuel cell (DMFC). Among these, a polymer electrolyte fuel cell and a direct methanol fuel cell having excellent mobility have received wide attention as a future power supply.

A polymer electrolyte fuel cell has a basic principle such that gas diffusing electrode layers are disposed on both surfaces of a polymer electrolyte membrane, and water is produced by a chemical reaction through the polymer electrolyte membrane by facing an anode toward a fuel electrode and a cathode toward an oxidation electrode, and the reaction energy produced therefrom is converted to electric energy.

A typical example of an ion-conducting polymer electrolyte membrane may include Nafion, a perfluorinated hydrogen ion exchange membrane developed by Dupont USA in early 1960s. Similar commercialized perfluorinated polymer electrolyte membranes other than Nafion include Aciplex-S membrane manufactured by Asahi Kasei Chemicals Corporation, Dow membrane manufactured by Dow Chemical Company, Flemion membrane manufactured by Asahi Glass Co., Ltd., and the like.

Existing commercialized perfluorinated polymer electrolyte membrane has chemical resistance, oxidation resistance, and excellent ion conductivity, but has a problem of high costs and causing environmental problems due to the toxicity of intermediates produced during manufacture. Accordingly, polymer electrolyte membranes in which a carboxyl group, a sulfonic acid group or the like is introduced to an aromatic ring polymer have been studied in order to compensate for the weaknesses of such perfluorinated polymer electrolyte membranes. Examples thereof include sulfonated polyarylether sulfone [Journal of Membrane Science, 1993, 83, 211], sulfonated polyetherether ketone [Japanese Patent Application Laid-Open Publication No. H06-93114, U.S. Pat. No. 5,438,082], sulfonated polyimide [U.S. Pat. No. 6,245,881] and the like.

A polymer electrolyte membrane accompanies changes in membrane thicknesses and volumes of 15% to 30% depending on a temperature and a degree of hydration, and accordingly, the electrolyte membrane is repeatedly expanded and contracted depending on the operation condition of a fuel cell, and microholes or cracks develop due to such volume changes. In addition, as a side reaction, hydrogen peroxide ($H_2O_2$) or peroxide radicals are generated from a reduction reaction of oxygen in a cathode, which may cause the degradation of the electrolyte membrane. A polymer electrolyte membrane for a fuel cell has been developed in the direction of improving mechanical and chemical durability keeping such a phenomenon that may occur during the fuel cell operation in mind.

Studies that have been carried out for improving mechanical durability include a reinforcing composite electrolyte membrane prepared by introducing a Nafion solution (5% by weight concentration) to an e-PTFE (U.S. Pat. No. 5,547,551), and a polymer blend composite membrane introducing a polymer having excellent dimensional stability to a sulfonated hydrocarbon-based polymer material (Korean Patent No. 10-0746339), and the like. In addition, W.L. Gore & Associates introduces a reinforcing composite electrolyte membrane product commercialized as a trade name of Gore Select.

In a reinforcing composite electrolyte membrane, a porous support is used in order to provide mechanical properties and dimensional stability. A porous support needs to maintain mechanical durability while not declining performance, therefore, a support made of suitable materials provided with high porosity and excellent mechanical properties needs to be selected. In addition, ion conductivity of a membrane may greatly vary depending on the method of immersing an ion conductor into a support and the type of the ion conductor, therefore, development of an effective method of immersing an ion conductor, and an ion conductor suitable for a reinforcing composite electrolyte membrane has been required.

DISCLOSURE

Technical Problem

An object of the present specification is to provide a polymer electrolyte membrane, and moreover, to provide a membrane electrode assembly including the polymer electrolyte membrane, and a fuel cell including the membrane electrode assembly.

Technical Solution

One embodiment of the present specification provides a polymer electrolyte membrane including a mixed layer that includes an ion migration region and a support having a 3-dimensional network structure, wherein the ion migration region has a structure in which two or more cells including a first ion-conducting polymer adjoin 3 dimensionally, and the first ion-conducting polymer has ion exchange capacity (IEC) of greater than or equal to 1.7 meq/g and less than or equal to 2.5 meq/g.

Another embodiment of the present specification provides a membrane electrode assembly including the polymer electrolyte membrane.

Still another embodiment of the present specification provides a fuel cell including the membrane electrode assembly.

Advantageous Effects

A polymer electrolyte membrane according to one embodiment of the present specification has an advantage of excellent durability. Specifically, using a membrane electrode assembly including the polymer electrolyte membrane according to one embodiment of the present specification in a fuel cell may contribute to performance enhancement of the fuel cell. In other words, the polymer electrolyte membrane according to one embodiment of the present specification minimizes performance decline of a fuel cell and allows the fuel cell to maintain steady performance even in a working environment of the fuel cell repeating high temperature humidification and drying leading to the repetition of contraction and expansion of a polymer electrolyte membrane.

In addition, the polymer electrolyte membrane according to the present specification has high ion conductivity while having excellent durability. In other words, the polymer electrolyte membrane according to the present specification minimizes an ion conductivity decrease caused by the inclusion of a support, and has an equal level of ion conductivity compared to cases without a support.

DESCRIPTION OF DRAWINGS

FIGS. 1 and 2 are diagrams illustrating one region of a surface of a polymer electrolyte membrane according to one embodiment of the present specification.

FIG. 3 is a diagram illustrating one region of a section of a polymer electrolyte membrane according to one embodiment of the present specification.

FIG. 4 is a diagram illustrating a structure of a fuel cell according to one embodiment of the present specification.

FIG. 5 shows a voltage of a polymer electrolyte membrane according to examples and a comparative example depending on current density in a fuel cell under a 100% relative humidity (RH) condition.

FIG. 6 shows a voltage of a polymer electrolyte membrane according to examples and a comparative example depending on current density in a fuel cell under a 50% relative humidity (RH) condition.

FIG. 7 shows a voltage of a polymer electrolyte membrane according to examples and a comparative example depending on current density in a fuel cell under a 32% relative humidity (RH) condition.

MODE OF DISCLOSURE

In the present specification, a description of one member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

Hereinafter, the present specification will be described in more detail.

The present specification provides a polymer electrolyte membrane including a mixed layer that includes an ion migration region and a support having a 3-dimensional network structure, wherein the ion migration region has a structure in which two or more cells including a first ion-conducting polymer adjoin 3 dimensionally, and the first ion-conducting polymer has ion exchange capacity (IEC) of greater than or equal to 1.7 meq/g and less than or equal to 2.5 meq/g.

The first ion-conducting polymer is included in the ion migration region and enables smooth ion migration in the mixed layer due to high ion conductivity, and is capable of enhancing performance of the polymer electrolyte membrane.

According to one embodiment of the present specification, the mixed layer may be formed by immersing the support into the first ion-conducting polymer. Specifically, according to one embodiment of the present specification, when the first ion-conducting polymer is included up to a thickness range of the support, a polymer electrolyte membrane without an additional pure layer may be formed. In addition, according to one embodiment of the present specification, when the first ion-conducting polymer is included exceeding a thickness range of the support, a polymer electrolyte membrane provided with an additional pure layer on an upper surface and/or a lower surface of the mixed layer may be prepared.

According to one embodiment of the present specification, the polymer electrolyte membrane includes a pure layer including a second ion-conducting polymer provided on an upper surface, or a lower surface, or an upper surface and a lower surface of the mixed layer, and ion exchange capacity (IEC) of the second ion-conducting polymer may be lower than ion exchange capacity (IEC) of the first ion-conducting polymer.

According to one embodiment of the present specification, the pure layer may be provided adjoining on an upper surface and/or a lower surface of the mixed layer, or provided on the additional pure layer.

According to one embodiment of the present specification, ion exchange capacity (IEC) of the second ion-conducting polymer may be lower than ion exchange capacity (IEC) of the first ion-conducting polymer by 0.2 meq/g or greater.

The second ion-conducting polymer is provided on at least one surface of the mixed layer, and may perform a role of preventing elution of the first ion-conducting polymer included in the mixed layer. Specifically, when using the polymer electrolyte membrane in a fuel cell, the first ion-conducting polymer may be eluted due to moisture, and the second ion-conducting polymer may perform a role of preventing elution of the first ion-conducting polymer caused by moisture.

According to one embodiment of the present specification, the second ion-conducting polymer may have ion exchange capacity (IEC) of greater than or equal to 0.9 meq/g and less than or equal to 1.8 meq/g.

According to one embodiment of the present specification, the pure layer may further include an additional pure layer including the first ion-conducting polymer provided adjoining the mixed layer.

The additional pure layer may be provided by a polymer that is the same as the first ion-conducting polymer included in the ion migration region adjoining an upper part, or a lower part, or an upper part and a lower part of the mixed layer. Specifically, the additional pure layer may be formed by immersing the support into the first ion-conducting polymer, and the first ion-conducting polymer remaining on an upper surface and/or a lower surface of the mixed layer.

The polymer electrolyte membrane according to the present specification has high ion conductivity while having excellent durability. Specifically, the polymer electrolyte membrane according to the present specification minimizes an ion conductivity decrease caused by the inclusion of a support, and has an equal level of ion conductivity compared to cases without a support. Accordingly, a fuel cell including the polymer electrolyte membrane according to the present specification minimizes electrolyte membrane damage occurring from a long operation, and furthermore, is capable of exhibiting high performance.

According to one embodiment of the present specification, the mixed layer may have a thickness of greater than or equal to 1 μm and less than or equal to 30 μm.

According to one embodiment of the present specification, the mixed layer may have a thickness of greater than or equal to 1 μm and less than or equal to 25 μm.

According to one embodiment of the present specification, the mixed layer may have a thickness of greater than or equal to 1 μm and less than or equal to 15 μm. When the mixed layer according to the present specification has a thickness of greater than or equal to 1 μm and less than or equal to 30 μm, high ion conductivity and durability may be obtained. In addition, when the mixed layer has a thickness in the above-mentioned range, durability decline due to a thickness decrease may hardly occur. In other words, when the thickness of the mixed layer is less than 1 μm, there is a disadvantage in that durability is not maintained, and when the thickness is greater than 30 μm, there is a disadvantage in that ion conductivity may decrease.

According to one embodiment of the present specification, the polymer electrolyte membrane may be formed with the mixed layer alone.

According to one embodiment of the present specification, the thicknesses of the pure layers provided on any one surface of the mixed layer may be each independently greater than 0 μm and less than or equal to 6 μm.

According to one embodiment of the present specification, the thickness of the additional pure layer may be greater than 0 μm and less than or equal to 5 μm.

According to one embodiment of the present specification, the thickness of the pure layer may include the thickness of the additional pure layer.

According to one embodiment of the present specification, a thickness difference between the pure layers each provided on an upper surface and a lower surface of the mixed layer may be 50% or less of a thickness of the mixed layer. Specifically, a thickness difference between the pure layers provided on an upper surface and a lower surface of the mixed layer may be 30% or less of a thickness of the mixed layer. According to one embodiment of the present specification, a thickness difference between the pure layers being 0% means that a thicknesses of the pure layers each provided on an upper surface and a lower surface of the mixed layer are the same.

According to one embodiment of the present specification, when a thickness difference between the pure layer provided on an upper surface of the mixed layer and the pure layer provided on a lower surface of the mixed layer is 50% or less of a thickness of the mixed layer, a degree of contraction and expansion of an upper surface and a lower surface of the polymer electrolyte membrane becomes similar even when repeating humidification and drying of the polymer electrolyte membrane, and development of cracks may be prevented.

According to one embodiment of the present specification, a thickness ratio of the mixed layer and the whole pure layer may be from 1:0 to 1:4. Specifically, a thickness ratio of the mixed layer and the whole pure layer may be from 1:0 to 1:1.5. More specifically, a thickness ratio of the mixed layer and the whole pure layer may be from 1:0 to 1:1.

The polymer electrolyte membrane according to one embodiment of the present specification is capable of exhibiting high durability under a condition of repeated humidified and dried states as a thickness ratio of the mixed layer increases with respect to the pure layer.

According to one embodiment of the present specification, a total thickness of the polymer electrolyte membrane may be greater than or equal to 3 μm and less than or equal to 36 μm.

According to one embodiment of the present specification, the ion migration region may be greater than or equal to 40% by volume and less than or equal to 85% by volume with respect to the total volume of the mixed layer.

According to one embodiment of the present specification, the ion migration region may be greater than or equal to 40% by volume and less than or equal to 80% by volume with respect to the total volume of the ion migration region and the support.

According to one embodiment of the present specification, the ion migration region may be greater than or equal to 40% by volume and less than or equal to 70% by volume with respect to the total volume of the mixed layer.

According to one embodiment of the present specification, the ion migration region may be greater than or equal to 40% by volume and less than or equal to 60% by volume with respect to the total volume of the mixed layer.

According to one embodiment of the present specification, the ion migration region may be greater than or equal to 40% by volume and less than or equal to 55% by volume with respect to the total volume of the mixed layer.

According to one embodiment of the present specification, the ion migration region may be greater than or equal to 45% by volume and less than or equal to 65% by volume with respect to the total volume of the mixed layer.

According to one embodiment of the present specification, the ion migration region may be greater than or equal to 45% by volume and less than or equal to 60% by volume with respect to the total volume of the mixed layer.

When the ion migration region of the polymer electrolyte membrane according to the present specification is greater than or equal to 40% by volume and less than or equal to 85% by volume, sufficient ion conductivity may be secured while securing durability of the polymer electrolyte membrane. In other words, when the ion migration region is less than 40% by volume, durability of the polymer electrolyte membrane is enhanced, however, there is a disadvantage in that sufficient ion conductivity is difficult to be secured. Moreover, when the ion migration region is greater than 85% by volume, ion conductivity of the polymer electrolyte membrane increases, however, there is a disadvantage in that durability is difficult to be secured.

FIGS. 1 and 2 are diagrams showing one region of a surface of the polymer electrolyte membrane according to one embodiment of the present specification. Specifically, FIG. 1 is a diagram illustrating one region of a horizontal surface of the polymer electrolyte membrane of the present specification, and FIG. 2 is a diagram illustrating one region of a vertical surface of the polymer electrolyte membrane of the present specification. Furthermore, the region expressed as a dark region means the support, and a light region means the ion migration region.

The vertical surface may mean a surface in a thickness direction of the polymer electrolyte membrane. In addition, the horizontal surface is a surface vertical to a thickness direction of the polymer electrolyte membrane, and may mean a surface occupying a relatively large area.

In FIG. 1 and FIG. 2, the ion migration region may mean a cell section, and cells 3 dimensionally adjoining the shown cells are present inside the polymer electrolyte membrane.

The cell of the present specification may have a spherical shape, a shape of pressed sphere, or a polyhedron shape, and when the cell has a spherical shape, the cell section may have a closed figure having an aspect ratio of 1:1 to 5:1.

When nodes and fibrous branches connecting the nodes of the support are connected in the cell of the present specification, the cell may mean a virtual 3-dimensional closed space surrounded by virtual planes formed. The node may mean a site at which two or more fibrous branches meet.

FIG. 3 is a diagram illustrating one region of a section of the polymer electrolyte membrane according to one embodiment of the present specification. Specifically, the dotted region in FIG. 3 is a virtual line, and is to divide the virtual 3-dimensional closed space. The region expressed as a dark region is fibrous branches or nodes of the support, and these are connected 3 dimensionally.

In addition, the cell of the present specification is a unit space of an ion migration region including an ion-conducting polymer surrounded by fibrous branches of the support, and horizontal and vertical direction sections of the virtual 3-dimensional closed space when being surrounded by fibers of the support may have a figure of a circle, an ellipse or a simple closed curve.

In addition, the cell of the present specification means having a volume of certain sizes or larger, and cells having a diameter of less than 40 nm may not be considered as the cell.

The diameter of the cell in the present specification may mean a length of the longest line crossing the cell.

According to one embodiment of the present specification, on any surface horizontal to an upper surface of the polymer electrolyte membrane, the cells may be laminated in two or more layers in any one direction (x-axis direction), a direction vertical thereto (y-axis direction), and a thickness direction of the polymer electrolyte membrane (z-axis direction).

According to one embodiment of the present specification, the support may have a sponge structure in which two or more of the cells are distributed.

According to one embodiment of the present specification, the support may have a structure in which the cells are regularly distributed. Specifically, according to one embodiment of the present specification, the support may have a porosity variation of 10% or less depending on any unit volume.

According to one embodiment of the present specification, sections of two or more of the cells may be included in both a vertical section and a horizontal section of the polymer electrolyte membrane.

A diameter of the cell section of the present specification may mean a length of the longest line crossing the cell section.

According to one embodiment of the present specification, the cell section on a horizontal surface of the polymer electrolyte membrane may have an aspect ratio of 1:1 to 5:1.

According to one embodiment of the present specification, the cell section on a vertical surface of the polymer electrolyte membrane may have an aspect ratio of 1:1 to 10:1.

According to one embodiment of the present specification, a diameter size of the cell section on a horizontal surface of the polymer electrolyte membrane may be greater than or equal to 40 nm and less than or equal to 500 nm.

According to one embodiment of the present specification, a diameter size of the cell section on a vertical surface of the polymer electrolyte membrane may be greater than or equal to 40 nm and less than or equal to 500 nm.

According to one embodiment of the present specification, a ratio of the cell numbers per 100 $\mu$mm$^2$ of a horizontal surface and a vertical surface of the polymer electrolyte membrane may be from 1:1 to 1:5.

According to one embodiment of the present specification, a variation in the cell numbers on a vertical section and a horizontal section per 100 $\mu$mm$^2$ of the polymer electrolyte membrane may be greater than or equal to 0 and less than or equal to 500.

According to one embodiment of the present specification, an average diameter size of the cell sections may be greater than or equal to 40 nm and less than or equal to 500 nm.

According to one embodiment of the present specification, a standard deviation of the diameters of the cell sections may be from 50 nm to 200 nm.

According to one embodiment of the present specification, the cell diameters may be greater than or equal to 40 nm and less than or equal to 1000 nm.

According to one embodiment of the present specification, in any section of the polymer electrolyte membrane, the cell sections may occupy from 50% to 90% of the total sectional area.

According to one embodiment of the present specification, the support is formed with two or more nodes, and each node may include three or more branches.

According to one embodiment of the present specification, a distance between any one node and another adjacent node of the support may be from 10 nm to 500 nm.

According to one embodiment of the present specification, a length from the center of the cell to any point of the support may be from 20 nm to 500 nm.

According to one embodiment of the present specification, the ion migration region may include 3 or more inflection points per 1 $\mu$m during ion migration. The inflection points may be tortuosity factors, and may be expressed by 3 or more tortuosity factors per 1 $\mu$m.

According to one embodiment of the present specification, the support may include a hydrocarbon-based or a fluorine-based material.

According to one embodiment of the present specification, the support may include a semi-crystalline polymer.

The semi-crystalline polymer of the present specification may have a crystallinity range of 20% to 80%.

According to one embodiment of the present specification, the semi-crystalline polymer may include polyolefin, fluorocarbon, polyamide, polyester, polyacetal (or polyoxymethylene), polysulfide, polyvinyl alcohol, copolymers thereof and combinations thereof, but is not limited thereto.

According to one embodiment of the present specification, the support may include those derived from polyolefin-based materials.

The polyolefin may include polyethylene (LDPE, LLDPE, HDPE, UHMWPE), polypropylene, polybutene, polymethylpentene, copolymers thereof and blends thereof.

The fluorocarbon may include polytetrafluoroethylene (PTFE), polyclhorotrifluoroethylene (PCTFE), fluorinated ethylene propylene (FEP), ethylene chlorotrifluoroethylene (ECTFE), ethylene tetrafluoroethylene (ETFE), polyvinylidene fluoride (PVDF), polyvinyl fluoride (PVF), a perfluoroalkoxy (PFA) resin, copolymers thereof and blends thereof, but is not limited thereto.

The polyamide may include polyamide 6, polyamide 6/6, nylon 10/10, polyphthalamide (PPA), copolymers thereof and blends thereof, but is not limited thereto.

The polyester may include polyester terephthalate (PET), polybutylene terephthalate (PBT), poly-1-4-cyclohexylenedimethylene terephthalate (PCT), polyethylene naphthalate (PEN) and liquid crystal polymers (LCP), but is not limited thereto.

The polysulfide includes polyphenyl sulfide, polyethylene sulfide, copolymers thereof and blends thereof, but is not limited thereto.

The polyvinyl alcohol includes ethylene-vinyl alcohol, copolymers thereof and blends thereof, but is not limited thereto.

According to one embodiment of the present specification, the ion-conducting polymer may include a cation-conducting polymer and/or an anion-conducting polymer.

According to one embodiment of the present specification, the ion-conducting polymer may include a proton-conducting material.

According to one embodiment of the present specification, the first ion-conducting polymer and the second ion-conducting polymer may each include one, two or more types selected from the group consisting of sulfonated benzimidazole-based polymers, sulfonated polyimide-based polymers, sulfonated polyetherimide-based polymers, sulfonated polyphenylene sulfide-based polymers, sulfonated polysulfone-based polymers, sulfonated polyethersulfone-based polymers, sulfonated polyetherketone-based polymers, sulfonated polyether-ether ketone-based polymers, sulfonated polyphenyl quinoxaline-based polymers, polymers in which a sulfonated partial fluorine-based is introduced, and sulfonated fluorine-based polymers.

According to one embodiment of the present specification, the ion-conducting polymer may have ion conductivity of 1 mS/cm or greater at 60° C. or higher.

According to one embodiment of the present specification, the polymer electrolyte membrane may have air permeability of 6 sec/100 ml or greater.

According to one embodiment of the present specification, the ion migration region may include the first ion-conducting polymer in greater than or equal to 70% by volume and less than or equal to 100% by volume.

The polymer electrolyte membrane of the present specification has an advantage of excellent tensile strength and elongation.

The tensile strength and the elongation of the present specification means measuring a polymer electrolyte membrane cut in the form of a dog bone in accordance with the American Society for Testing and Materials (ASTM) standard at a speed of 10 mm/min using a united test machine (UTM). The UTM is an apparatus simultaneously measuring tensile strength and elongation, and is an apparatus generally used in the art.

According to one embodiment of the present specification, the polymer electrolyte membrane may have tensile strength of greater than or equal to 200 kgf/cm$^2$ and less than or equal to 2000 kgf/cm$^2$, or greater than or equal to 500 kgf/cm$^2$ and less than or equal to 1500 kgf/cm$^2$.

According to one embodiment of the present specification, the polymer electrolyte membrane may have elongation of greater than or equal to 50% and less than or equal to 300%. Alternatively, the polymer electrolyte membrane may have elongation of greater than or equal to 100% and less than or equal to 300%.

The polymer electrolyte membrane of the present specification has an advantage of excellent durability. Specifically, excellent durability of the polymer electrolyte membrane may be identified through an RH cycle.

The RH cycle of the present specification means measuring durability in a fuel cell state after preparing a polymer electrolyte membrane to a membrane electrode assembly (MEA). Specifically, the RH cycle of the present specification means measuring durability under a condition of 80° C. while injecting nitrogen to an anode at a flow rate of 0.95 slm (standard liter per minute), injecting nitrogen to a cathode at a flow rate of 1.0 slm, and switching between humidification of RH 150% and non-humidification of RH 0% at an interval of two minutes.

Moreover, the RH cycle of the present specification being higher means a polymer electrolyte membrane having higher durability. In addition, the RH cycle means the number of cycles up to the cycle at which a polymer electrolyte membrane is damaged enough to be unusable as an MEA.

In order to measure damage on the electrolyte membrane during the RH cycle of the present specification, linear sweep voltammetry (LSV) is used. Specifically, the LSV means measuring hydrogen crossover at 0.1 V to 0.4 V (2 mV/s) while injecting hydrogen to an anode at a flow rate of 0.2 slm, and injecting nitrogen to a cathode at a flow rate of 0.2 slm. In other words, when the hydrogen crossover value increases during the RH cycle, a polymer electrolyte membrane may be considered to be damaged, and by the degree of a hydrogen crossover value increase, the degree of polymer electrolyte membrane damage may be determined.

In other words, the RH cycle having a higher number means a polymer electrolyte membrane having higher durability, and when the RH cycle is 20,000 cycles or greater, a polymer electrolyte membrane is generally considered to have excellent durability. The polymer electrolyte membrane according to one embodiment of the present specification is capable of maintaining steady performance with almost no performance decline even when the RH cycle is 20,000 cycles or greater.

According to one embodiment of the present specification, the polymer electrolyte membrane may have an RH cycle of 20,000 cycles or higher. Moreover, the polymer electrolyte membrane of the present specification may have an RH cycle of 40,000 cycles or higher, or 50,000 cycles or higher. In addition, the polymer electrolyte membrane may have an RH cycle of 75,000 cycles or higher, or 80,000 cycles or higher. The polymer electrolyte membrane hardly experiences performance decline in the above-mentioned RH cycle number range.

According to one embodiment of the present specification, the polymer electrolyte membrane may have an RH cycle of 200,000 cycles or less. Alternatively, according to one embodiment of the present specification, the polymer electrolyte membrane may have an RH cycle of 150,000 cycles or less, or 100,000 cycles or less.

According to one embodiment of the present specification, the polymer electrolyte membrane may have an RH cycle of greater than or equal to 1 cycle and less than or equal to 150,000 cycles.

According to one embodiment of the present specification, the polymer electrolyte membrane may have an RH cycle of greater than or equal to 20,000 cycles and less than or equal to 150,000 cycles.

According to one embodiment of the present specification, the polymer electrolyte membrane may have an RH cycle of greater than or equal to 40,000 cycles and less than or equal to 150,000 cycles.

According to one embodiment of the present specification, the polymer electrolyte membrane may have an RH cycle of greater than or equal to 50,000 cycles and less than or equal to 150,000 cycles.

According to one embodiment of the present specification, the polymer electrolyte membrane may have an RH cycle of greater than or equal to 70,000 cycles and less than or equal to 150,000 cycles.

According to one embodiment of the present specification, the polymer electrolyte membrane may have a mixed layer thickness of greater than or equal to 1 μm and less than or equal to 30 μm, and an RH cycle of greater than or equal to 20,000 cycles and less than or equal to 150,000 cycles.

According to one embodiment of the present specification, the polymer electrolyte membrane may have a mixed layer thickness of greater than or equal to 1 μm and less than or equal to 30 μm, and an RH cycle of greater than or equal to 40,000 cycles and less than or equal to 150,000 cycles.

According to one embodiment of the present specification, the polymer electrolyte membrane may have a mixed layer thickness of greater than or equal to 1 μm and less than or equal to 30 μm, and an RH cycle of greater than or equal to 50,000 cycles and less than or equal to 150,000 cycles.

According to one embodiment of the present specification, the polymer electrolyte membrane may have a mixed layer thickness of greater than or equal to 1 μm and less than or equal to 30 μm, and an RH cycle of greater than or equal to 70,000 cycles and less than or equal to 150,000 cycles.

According to one embodiment of the present specification, the polymer electrolyte membrane may have a mixed layer thickness of greater than or equal to 1 μm and less than or equal to 15 μm, and an RH cycle of greater than or equal to 20,000 cycles and less than or equal to 150,000 cycles.

According to one embodiment of the present specification, the polymer electrolyte membrane may have a mixed layer thickness of greater than or equal to 1 μm and less than or equal to 15 μm, and an RH cycle of greater than or equal to 40,000 cycles and less than or equal to 150,000 cycles.

According to one embodiment of the present specification, the polymer electrolyte membrane may have a mixed layer thickness of greater than or equal to 1 μm and less than or equal to 15 μm, and an RH cycle of greater than or equal to 50,000 cycles and less than or equal to 150,000 cycles.

According to one embodiment of the present specification, the polymer electrolyte membrane may have a mixed layer thickness of greater than or equal to 1 μm and less than or equal to 15 μm, and an RH cycle of greater than or equal to 70,000 cycles and less than or equal to 150,000 cycles.

According to one embodiment of the present specification, the polymer electrolyte membrane may have a total pure layer thickness of greater than or equal to 0 μm and less than or equal to 10 μm, and an RH cycle of greater than or equal to 20,000 cycles and less than or equal to 150,000 cycles.

According to one embodiment of the present specification, the polymer electrolyte membrane may have a total pure layer thickness of greater than or equal to 0 μm and less than or equal to 10 μm, and an RH cycle of greater than or equal to 40,000 cycles and less than or equal to 150,000 cycles.

According to one embodiment of the present specification, the polymer electrolyte membrane may have a total pure layer thickness of greater than or equal to 0 μm and less than or equal to 10 μm, and an RH cycle of greater than or equal to 50,000 cycles and less than or equal to 150,000 cycles.

According to one embodiment of the present specification, the polymer electrolyte membrane may have a total pure layer thickness of greater than or equal to 0 μm and less than or equal to 10 μm, and an RH cycle of greater than or equal to 70,000 cycles and less than or equal to 150,000 cycles.

According to one embodiment of the present specification, the polymer electrolyte membrane may have a mixed layer thickness of greater than or equal to 1 μm and less than or equal to 30 μm, the total pure layer thickness of greater than or equal to 0 μm and less than or equal to 10 μm, and an RH cycle of greater than or equal to 20,000 cycles and less than or equal to 150,000 cycles.

According to one embodiment of the present specification, the polymer electrolyte membrane may have a mixed layer thickness of greater than or equal to 1 μm and less than or equal to 30 μm, a total pure layer thickness of greater than or equal to 0 μm and less than or equal to 10 μm, and an RH cycle of greater than or equal to 40,000 cycles and less than or equal to 150,000 cycles.

According to one embodiment of the present specification, the polymer electrolyte membrane may have a mixed layer thickness of greater than or equal to 1 μm and less than or equal to 30 μm, a total pure layer thickness of greater than or equal to 0 μm and less than or equal to 10 μm, and an RH cycle of greater than or equal to 50,000 cycles and less than or equal to 150,000 cycles.

According to one embodiment of the present specification, the polymer electrolyte membrane may have a mixed layer thickness of greater than or equal to 1 μm and less than or equal to 30 μm, a total pure layer thickness of greater than or equal to 0 μm and less than or equal to 10 μm, and an RH cycle of greater than or equal to 70,000 cycles and less than or equal to 150,000 cycles.

According to one embodiment of the present specification, the polymer electrolyte membrane may have a mixed layer thickness of greater than or equal to 1 μm and less than or equal to 15 μm, a total pure layer thickness of greater than or equal to 0 μm and less than or equal to 10 μm, and an RH cycle of greater than or equal to 20,000 cycles and less than or equal to 150,000 cycles.

According to one embodiment of the present specification, the polymer electrolyte membrane may have a mixed layer thickness of greater than or equal to 1 μm and less than or equal to 15 μm, a total pure layer thickness of greater than or equal to 0 μm and less than or equal to 10 μm, and an RH cycle of greater than or equal to 40,000 cycles and less than or equal to 150,000 cycles.

According to one embodiment of the present specification, the polymer electrolyte membrane may have a mixed layer thickness of greater than or equal to 1 μm and less than or equal to 15 μm, a total pure layer thickness of greater than or equal to 0 μm and less than or equal to 10 μm, and an RH cycle of greater than or equal to 50,000 cycles and less than or equal to 150,000 cycles.

According to one embodiment of the present specification, the polymer electrolyte membrane may have a mixed layer thickness of greater than or equal to 1 µm and less than or equal to 15 µm, a total pure layer thickness of greater than or equal to 0 µm and less than or equal to 10 µm, and an RH cycle of greater than or equal to 70,000 cycles and less than or equal to 150,000 cycles.

The present specification provides a membrane electrode assembly including the polymer electrolyte membrane. In addition, the present specification provides a fuel cell including the membrane electrode assembly.

The fuel cell of the present specification includes fuel cells generally known in the art.

One embodiment of the present specification provides a fuel cell including a stack that includes the membrane electrode assembly and a separator provided between the membrane electrode assemblies; a fuel supply unit supplying fuel to the stack; and an oxidizer supply unit supplying an oxidizer to the stack.

FIG. 4 is a diagram illustrating a structure of the fuel cell according to one embodiment of the present specification, and the fuel cell is formed including a stack (60), an oxidizer supply unit (70) and a fuel supply unit (80).

The stack (200) includes one, two or more of the membrane electrode assemblies, and when two or more of the membrane electrode assemblies are included, a separator provided therebetween is included.

The separator prevents the membrane electrode assemblies from being electrically connected, and performs a role of transferring a fuel and an oxidizer supplied from the outside.

The oxidizer supply unit (70) performs a role of supplying an oxidizer to the stack (60). As the oxidizer, oxygen is typically used, and oxygen or air may be used by being injected with a pump (70).

The fuel supply unit (80) performs a role of supplying a fuel to the stack (60), and may be formed with a fuel tank (81) storing a fuel, and a pump (82) supplying the fuel stored in the fuel tank (81) to the stack (60). As the fuel, a hydrogen or hydrocarbon fuel in a gas or liquid state may be used, and examples of the hydrocarbon fuel may include methanol, ethanol, propanol, butanol or natural gas.

Hereinafter, the present specification will be described in detail with reference to examples. However, examples according to the present specification may be modified to various other forms, and the scope of the present specification is not interpreted to be limited to the examples described below. Examples in the present specification are provided in order to more completely describe the present specification for those having average knowledge in the art.

EXAMPLE 1

An immersion solution was prepared by dissolving 7 wt % of a hydrocarbon-based polymer having ion exchange capacity (IEC) of 2.16 meq/g in dimethyl sulfoxide (DMSO). Into the immersion solution, a support having a thickness of approximately 5 µm, porosity of approximately 80%, and a 3-dimensional network structure in which two or more cells are regularly distributed was immersed. After that, the result was dried for 24 hours in an oven at 80° C. to prepare a mixed layer. A solution was prepared by dissolving 7 wt % of a hydrocarbon-based polymer having ion exchange capacity (IEC) of 1.81 meq/g in dimethyl sulfoxide (DMSO), and the solution was applied on an upper surface and a lower surface of the mixed layer, and the result was dried for 24 hours in an oven at 80° C. to prepare a pure layer. The prepared polymer electrolyte membrane was acid treated with 10% sulfuric acid for 24 hours at 80° C., washed 4 or more times with distilled water, and dried at 80° C. to prepare a polymer electrolyte membrane.

EXAMPLE 2

A polymer electrolyte membrane was prepared in the same manner as in Example 1 except that the hydrocarbon-based polymer included in the immersion solution had ion exchange capacity (IEC) of 1.81 meq/g, and the pure layer was not additionally formed.

COMPARATIVE EXAMPLE 1

A polymer electrolyte membrane was prepared in the same manner as in Example 1 except that the hydrocarbon-based polymer included in the immersion solution had ion exchange capacity (IEC) of 1.68 meq/g, ePTFE having a thickness of approximately 5 µm, porosity of 85% or greater, and a structure in which pores that may not be defined as cells are irregularly distributed was used as the support, and the pure layer was not additionally formed.

TEST EXAMPLE

In order to measure performance of the polymer electrolyte membranes prepared according to the examples and the comparative example in a fuel cell, a membrane electrode assembly including the polymer electrolyte membrane was prepared. Specifically, the polymer electrolyte membrane was cut into a square of 8 cm×8 cm, and a carbon-supported platinum catalyst having Pt of 0.4 mg/cm$^2$ was transferred in a size of 5 cm×5 cm to an upper surface and a lower surface of the polymer electrolyte membrane to prepare a membrane-electrode assembly.

Performance evaluations for the prepared membrane electrode assembly were carried out under a condition of 100% relative humidity (RH), 50% relative humidity (RH) and 32% relative humidity (RH) under a H$_2$/air and atmospheric pressure condition.

FIG. 5 shows a voltage of the polymer electrolyte membrane according to the examples and the comparative example depending on current density in a fuel cell under a 100% relative humidity (RH) condition.

FIG. 6 shows a voltage of the polymer electrolyte membrane according to the examples and the comparative example depending on current density in a fuel cell under a 50% relative humidity (RH) condition.

FIG. 7 shows a voltage of the polymer electrolyte membrane according to the examples and the comparative example depending on current density in a fuel cell under a 32% relative humidity (RH) condition.

According to the results of FIG. 5 to FIG. 7, it was seen that the polymer electrolyte membranes according to the examples exhibited higher performance compared to the polymer electrolyte membrane according to the comparative example.

In addition, from the performance results under a low humidity condition of FIG. 7, it was seen that stable performance was obtained in the polymer electrolyte membranes of the examples compared to the polymer electrolyte membrane of the comparative example.

As can be seen from the results of FIG. 5 to FIG. 7, stable performance may be obtained under a high humidity condition in the polymer electrolyte membranes according to the examples, and when a pure layer is provided as in the polymer electrolyte membrane according to Example 1, more stable and outstanding performance is capable of being maintained even under a low humidity condition.

The invention claimed is:

1. A polymer electrolyte membrane comprising:
a mixed layer including an ion migration region having a structure in which two or more cells including a first ion-conducting polymer adjoin 3 dimensionally;
a pure layer including a second ion-conducting polymer provided on an upper surface, or a lower surface, or an upper surface and a lower surface of the mixed layer; and
a support having a 3-dimensional network structure, wherein:
the first ion-conducting polymer has ion exchange capacity (IEC) of greater than or equal to 1.7 meq/g and less than or equal to 2.5 meq/g;
the second ion-conducting polymer has ion exchange capacity (IEC) lower than the ion exchange capacity (IEC) of the first ion-conducting polymer by 0.2 meq/g or greater, and
the support has a structure in which the cells are regularly distributed and a porosity variation of 10% or less depending on any unit volume.

2. The polymer electrolyte membrane of claim 1, wherein the pure layer further includes an additional pure layer including the first ion-conducting polymer provided adjoining the mixed layer.

3. The polymer electrolyte membrane of claim 1, wherein the mixed layer has a thickness of greater than or equal to 1 μm and less than or equal to 30 μm.

4. The polymer electrolyte membrane of claim 1, wherein the pure layer comprises a first pure layer provided on the upper surface of the mixed layer and a second pure layer provided on the lower surface of the mixed layer, and a thickness difference between the first pure layer provided on the upper surface of the mixed layer and the second pure layer provided on the lower surface of the mixed layer is 50% or less of a thickness of the mixed layer.

5. The polymer electrolyte membrane of claim 1, wherein a thickness ratio of the mixed layer and the whole pure layer is between 1:0 to 1:4.

6. The polymer electrolyte membrane of claim 1, wherein the ion migration region is greater than or equal to 40% by volume and less than or equal to 85% by volume with respect to the total volume of the mixed layer.

7. The polymer electrolyte membrane of claim 1, wherein the support has a sponge structure in which two or more of the cells are distributed.

8. The polymer electrolyte membrane of claim 1 comprising sections of two or more of the cells in both a vertical section and a horizontal section of the polymer electrolyte membrane.

9. The polymer electrolyte membrane of claim 1, wherein the support is formed with two or more nodes, and each node includes three or more branches.

10. The polymer electrolyte membrane of claim 1, wherein the ion migration region includes 3 or more inflection points per 1 μm during ion migration.

11. The polymer electrolyte membrane of claim 1, wherein the support includes a hydrocarbon-based or a fluorine-based material.

12. The polymer electrolyte membrane of claim 1, wherein the first ion-conducting polymer and the second ion-conducting polymer each include one, two or more types selected from the group consisting of sulfonated benzimidazole-based polymers, sulfonated polyimide-based polymers, sulfonated polyetherimide-based polymers, sulfonated polyphenylene sulfide-based polymers, sulfonated polysulfone-based polymers, sulfonated polyethersulfone-based polymers, sulfonated polyetherketone-based polymers, sulfonated polyether-ether ketone-based polymers, sulfonated polyphenyl quinoxaline-based polymers, polymers in which a sulfonated partial fluorine-based is introduced, and sulfonated fluorine-based polymers.

13. The polymer electrolyte membrane of claim 1, which has air permeability of 6 sec/100 ml or greater.

14. The polymer electrolyte membrane of claim 1, wherein the ion migration region includes the first ion-conducting polymer in greater than or equal to 70% by volume and less than or equal to 100% by volume.

15. The polymer electrolyte membrane of claim 1, which has tensile strength of greater than or equal to 200 kgf/cm$^2$ and less than or equal to 2000 kgf/cm$^2$.

16. The polymer electrolyte membrane of claim 1, which has elongation of greater than or equal to 50% and less than or equal to 300%.

17. The polymer electrolyte membrane of claim 1, which has an RH cycle of 20,000 cycles or higher.

18. A membrane electrode assembly comprising the polymer electrolyte membrane of claim 1.

19. A fuel cell comprising the membrane electrode assembly of claim 18.

* * * * *